US009398756B2

(12) United States Patent
Eckert

(10) Patent No.: US 9,398,756 B2
(45) Date of Patent: Jul. 26, 2016

(54) LEASH TRAINING DEVICE AND A METHOD OF USING THE SAME TO TRAIN A DOMESTICATED ANIMAL

(71) Applicant: Cheryl Eckert, Sherman Oaks, CA (US)

(72) Inventor: Cheryl Eckert, Sherman Oaks, CA (US)

( * ) Notice: Subject to any disclaimer, the term of this patent is extended or adjusted under 35 U.S.C. 154(b) by 0 days.

(21) Appl. No.: 14/732,004

(22) Filed: Jun. 5, 2015

(65) Prior Publication Data

US 2015/0373949 A1 Dec. 31, 2015

Related U.S. Application Data

(60) Provisional application No. 62/017,022, filed on Jun. 25, 2014.

(51) Int. Cl.
*A01K 27/00* (2006.01)
*A01K 15/02* (2006.01)
*B05B 11/00* (2006.01)

(52) U.S. Cl.
CPC ............... *A01K 15/02* (2013.01); *A01K 27/004* (2013.01); *A01K 27/009* (2013.01); *B05B 11/0037* (2013.01); *B05B 11/3015* (2013.01); *B05B 11/0056* (2013.01)

(58) Field of Classification Search
CPC . A01K 27/004; A01K 27/006; A01K 27/008; A01K 15/02; A61D 7/00; E01H 1/1213
USPC .......... 119/712, 792–798, 161, 860; 222/175; 294/1.3
See application file for complete search history.

(56) References Cited

U.S. PATENT DOCUMENTS 5,501,179 A * 3/1996 Cory .................... A01K 15/023 119/712
6,327,998 B1 * 12/2001 Andre .................... A01K 15/02 119/712
7,174,856 B2 * 2/2007 Neri ....................... A01K 15/02 119/712
7,506,615 B1 * 3/2009 Sansone ............... A01K 27/006 119/161
D635,725 S * 4/2011 Levy ............................ D30/153
7,992,525 B1 * 8/2011 Fisher .................... A01K 15/02 119/860
8,671,889 B2 * 3/2014 Berton ................. A01K 27/004 119/794
8,763,563 B2 * 7/2014 Thalmann ............ A01K 15/029 119/792
8,991,654 B2 * 3/2015 MacIntyre, III ....... B65D 83/20 222/1
2003/0136353 A1 * 7/2003 Cory ...................... A01K 15/02 119/712

(Continued)

OTHER PUBLICATIONS

How to Train Your Dog to Leave It. For Dummies; Archived on Jan. 23, 2013 on archive.org [retrieved on Sep. 1, 2015]; Retrieved from the Internet: <URL:http://www.dummies.com/how-to/content/how-to-train-your-dog-to-leave-it.html>.

(Continued)

*Primary Examiner* — Yvonne Abbott-Lewis
(74) *Attorney, Agent, or Firm* — Dunlap Bennett & Ludwig PLLC

(57) ABSTRACT

A leash training device embodying a non-invasive and non-threatening method of using the same to train a dog is provided. The leash training device may include a liquid sprayer having a housing forming a handle portion and a leash assembly. While grasping the handle portion so as to manage the dog on the other end of the leash assembly, the liquid sprayer is adapted so that the user may discharge a jet of liquid from a reservoir secured within the housing. The method includes discharging the jet at or on the dog engaged in bad behavior.

8 Claims, 4 Drawing Sheets

(56) References Cited

U.S. PATENT DOCUMENTS

| | | | | |
|---|---|---|---|---|
| 2005/0087148 | A1* | 4/2005 | Rabello | A01K 27/004 119/796 |
| 2005/0217609 | A1* | 10/2005 | Dorton | A01K 13/006 119/792 |
| 2006/0219182 | A1* | 10/2006 | Rabello | A01K 27/004 119/61.56 |
| 2008/0173257 | A1* | 7/2008 | Steiner | A01K 27/004 119/796 |
| 2010/0018468 | A1* | 1/2010 | Rabello | A01K 27/004 119/61.56 |
| 2010/0116857 | A1* | 5/2010 | Vickers | A01K 27/008 224/191 |
| 2010/0206246 | A1* | 8/2010 | Waldrep | A01K 27/007 119/796 |
| 2011/0120388 | A1* | 5/2011 | Shahbaz | A01K 27/004 119/796 |
| 2011/0139090 | A1* | 6/2011 | Harruna | A01K 27/004 119/796 |
| 2011/0197820 | A1 | 8/2011 | Goldy et al. | |
| 2011/0232587 | A1 | 9/2011 | Levy et al. | |
| 2012/0186539 | A1* | 7/2012 | Johnston | A01K 27/008 119/796 |
| 2015/0196010 | A1* | 7/2015 | Orubor | A01K 27/004 119/72 |

OTHER PUBLICATIONS

ISR dated Sep. 17, 2015.

* cited by examiner 100
18
5
56
10
54
14
5
52
50

22
18
12
24
14
10

24
18
44
44
10
46
22
16
64
44
12

70
24
28
30
26
34
32
36
16
80
12
44
48
18
20
38
66
58
42
40
46
22
14
10
200
USER TAKES DOG FOR A WALK USING THE SPRAY LEASH
DOG IS BEHAVING BADLY
USER SPRAYS DOG TO CORRECT BEHAVIOR AND COMMANDS "LEAVE IT"
DOGS BEHAVIOR IMPROVES
210
220
230
240

18
9
20
50
24
46
42
48
48
56
38
14
60
12
48
48
48
22
36
60
48
56
9
48
48

18
20
48
26
24
30
38
14
34
56
28
36
32
12

60
24
38
60
26
28
62
56
32
34
36
60

18
10
26
24
20
48
14
38
30
32
56
28
34
12
36
10
24
20
38
12
34
14
36
56
16
10
10
38
12
14
16
26
62
62
62
62
28
44

LEASH TRAINING DEVICE AND A METHOD OF USING THE SAME TO TRAIN A DOMESTICATED ANIMAL

CROSS-REFERENCE TO RELATED APPLICATION

This application claims the benefit of priority of U.S. provisional application No. 62/017,022, 25 Jun. 2014, the contents of which are herein incorporated by reference.

BACKGROUND OF THE INVENTION

The present invention relates to the training of domesticated animals and, more particularly, to a dog leash training device and a non-invasive and non-threatening method of using the same to train a dog.

Bad dog behavior is a common issue when walking your dog. It can present many dangerous situations for the dog, bystanders, nearby property, and the dog owner, whereby personal injury, property damage and legal liability are at risk.

Current devices and methods of using them to train dogs involve choking, yanking, loud noises, electric shocks and other means that can physically and emotionally scar the dog. Giving rise to other related behavioral problems in the dog.

As can be seen, there is a need for a dog leash training device and a non-invasive and non-threatening method of using the same to train a dog.

SUMMARY OF THE INVENTION

In one aspect of the present invention, leash training device includes a housing having a front end and a rear end, wherein the housing forms an engagement opening and a handle portion; a sprayer outlet disposed near the front end; a leash assembly disposed near the front end; a reservoir secured within the engagement opening; and a liquid sprayer housed within the housing so as to fluidly communicate the sprayer outlet to the reservoir, wherein the liquid sprayer disposes a trigger near the handle portion.

In another aspect of the present invention, a method of training a domesticated animal restrained by a leash by using the above-mentioned leash training device includes filling the reservoir with a liquid; connecting the leash to the leash hook; and triggering the liquid sprayer to urge a jet of liquid from the reservoir, through the spray outlet, and toward the domesticated animal engaged in correctible behavior.

These and other features, aspects and advantages of the present invention will become better understood with reference to the following drawings, description and claims.

DETAILED DESCRIPTION OF THE INVENTION

Figure 1:
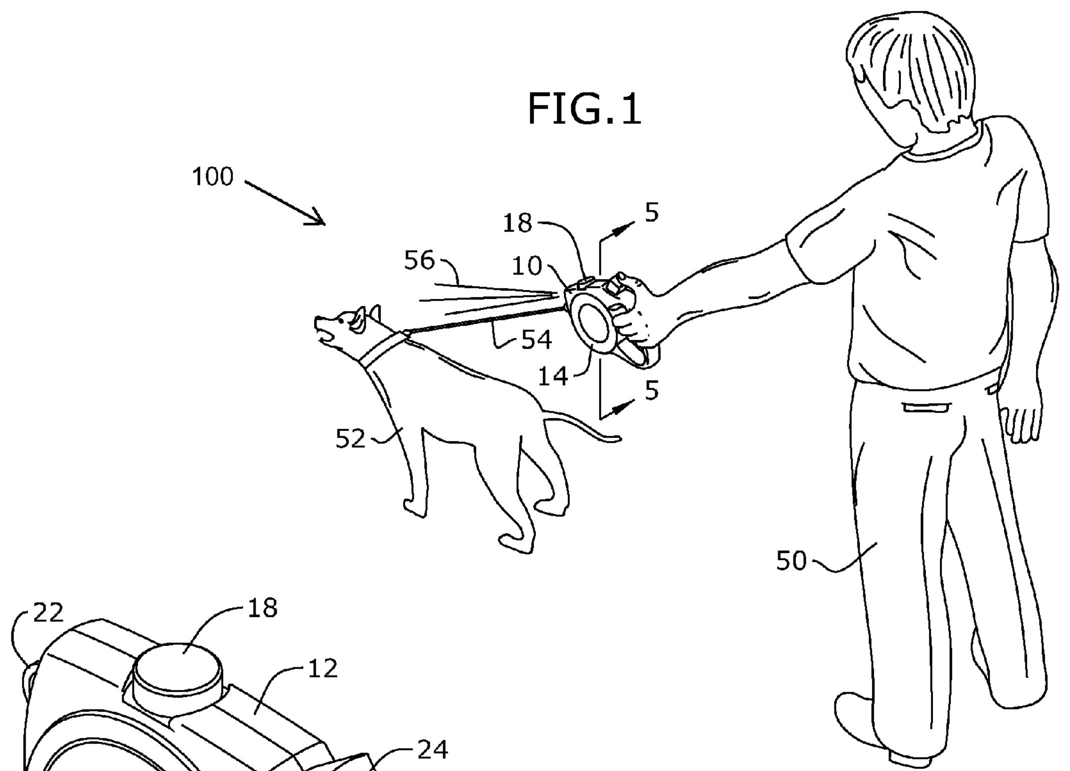
FIG. 1 is a perspective view of an exemplary embodiment of the present invention, shown in use.
Figure 2:
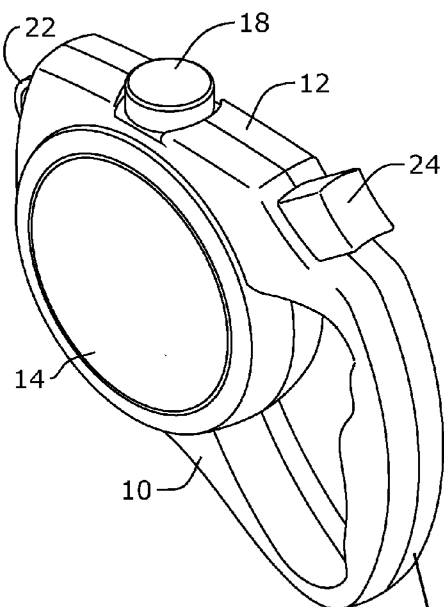
FIG. 2 is a front perspective view of an exemplary embodiment of the present invention.
Figure 3:
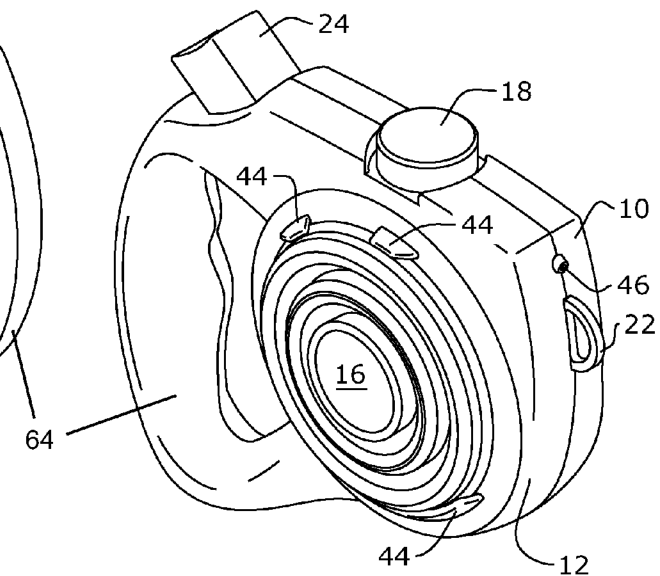
FIG. 3 is a back perspective view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a leash training device embodying a non-invasive and non-threatening method of using the same to train a domesticated animal, such as a dog. The leash training device may include a liquid sprayer having a housing forming a handle portion and a leash assembly. While grasping the handle portion so as to manage the dog on the other end of the leash assembly, the liquid sprayer is adapted so that the user may discharge a jet of liquid from a reservoir secured within the housing. The method includes discharging the jet at or on the dog engaged in bad behavior.

Referring to FIGS. 1 through 10, the present invention may include a training device 100 embodied in a method 200 for training a domesticated animal 52, including but not limited to a house pet, such as a dog, that engages in correctible behavior and that can understand commands related thereto. The training device 100 may include a liquid sprayer 80 having a housing forming a handle portion 64 and a leash assembly 90. The housing may be formed from the joining of a first portion 10 and a second portion 12. The first portion 10 and the second portion 12 may be dimensioned and adapted so as to provide a plurality fastener holes that align when interconnected by a plurality of fasteners 48. In an alternative embodiment, the housing may be formed from a unitary construction. The housing may have a front and rear ends. The handling portion 64 may be disposed near the rear end. The handle portion 64 may be dimensioned and adapted to enable a user 50 to single-handedly control the training device 10 so that it functions in accordance with the present invention as described herein.

The housing may form an engagement space dimensioned and adapted to securely engage a reservoir 14 when the housing is joined or formed. The reservoir 14 may form a cavity for receiving a liquid 56, such as water, liquid chemicals, liquid mixtures or the like. The reservoir 14 may form at least one depression 58. The reservoir 14 may form an inlet 66 and a spray outlet 46 for receiving and discharging the liquid 56, respectively. A gasket 20 and a cap 18 may be dimensioned and adapted for providing a water-light seal about the inlet 66. The spray outlet 46 may be adapted to discharge a liquid flow 60 under pressure. The spray outlet 46 may be disposed toward the front end of the housing.

The housing may form a plurality of attachment lips 44. The plurality of attachment lips 44 may be dimensioned and adapted to removably secure a flex bowl 16 provided by the present invention. The flex bowl 16 may therefore be used to receive the liquid 56 for providing to the domesticated animal 52.

The liquid sprayer 80 may include a pressure assembly 70. The pressure assembly 70 may include a trigger 24, a pump body 26, a spring 28, a plunger 30, an in-valve ball 32, an in-valve 34 and a tube 36 operably interconnected, as illustrated FIGS. 4 through 8, so as to urge the liquid flow 60 through the liquid sprayer 80 under pressure. The pump body 26 forms a chamber dimensioned and adapted to support the interconnected spring 28 and the plunger 30 and a portion of the liquid 56. The pump body 26 may form a pump ingress for receiving and a pump egress for discharging the liquid flow 60. The tube 36 may extend from the pump ingress and further into the cavity of the reservoir 14.

Figure 5:
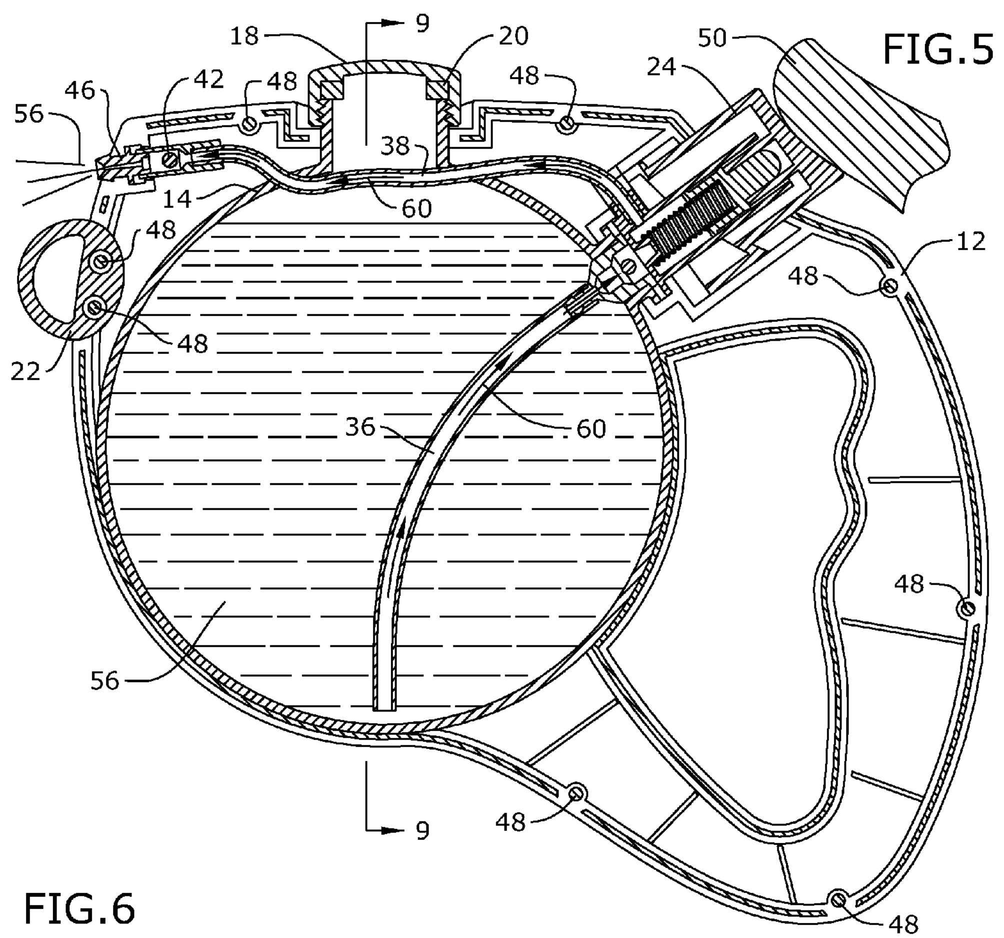
FIG. 5 is a section view of an exemplary embodiment of the present invention, taken from 5-5 in FIG. 1, illustrating a pressure assembly in a loaded position.
Figure 6:
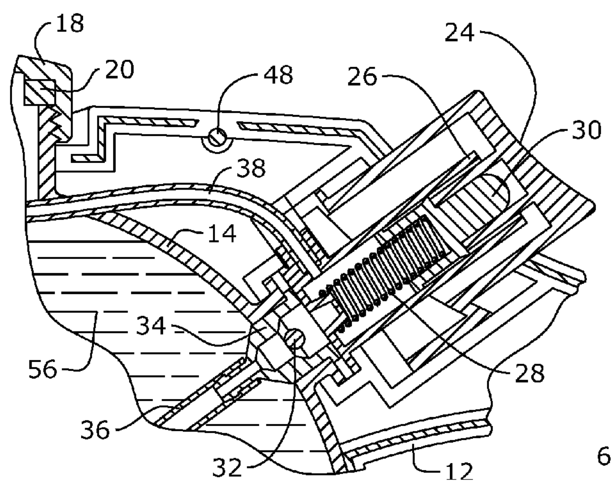
FIG. 6 is an enlarged section view of a portion of the exemplary embodiment of the present invention shown in FIG. 5.
Figure 7:
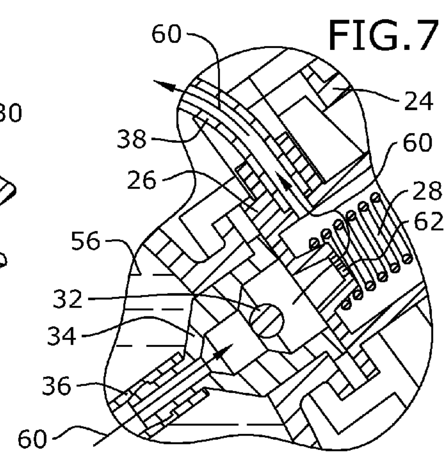
FIG. 7 is an enlarged section view of a portion of the exemplary embodiment of the present invention shown in FIG. 5.
Figures 8, 9, 10:
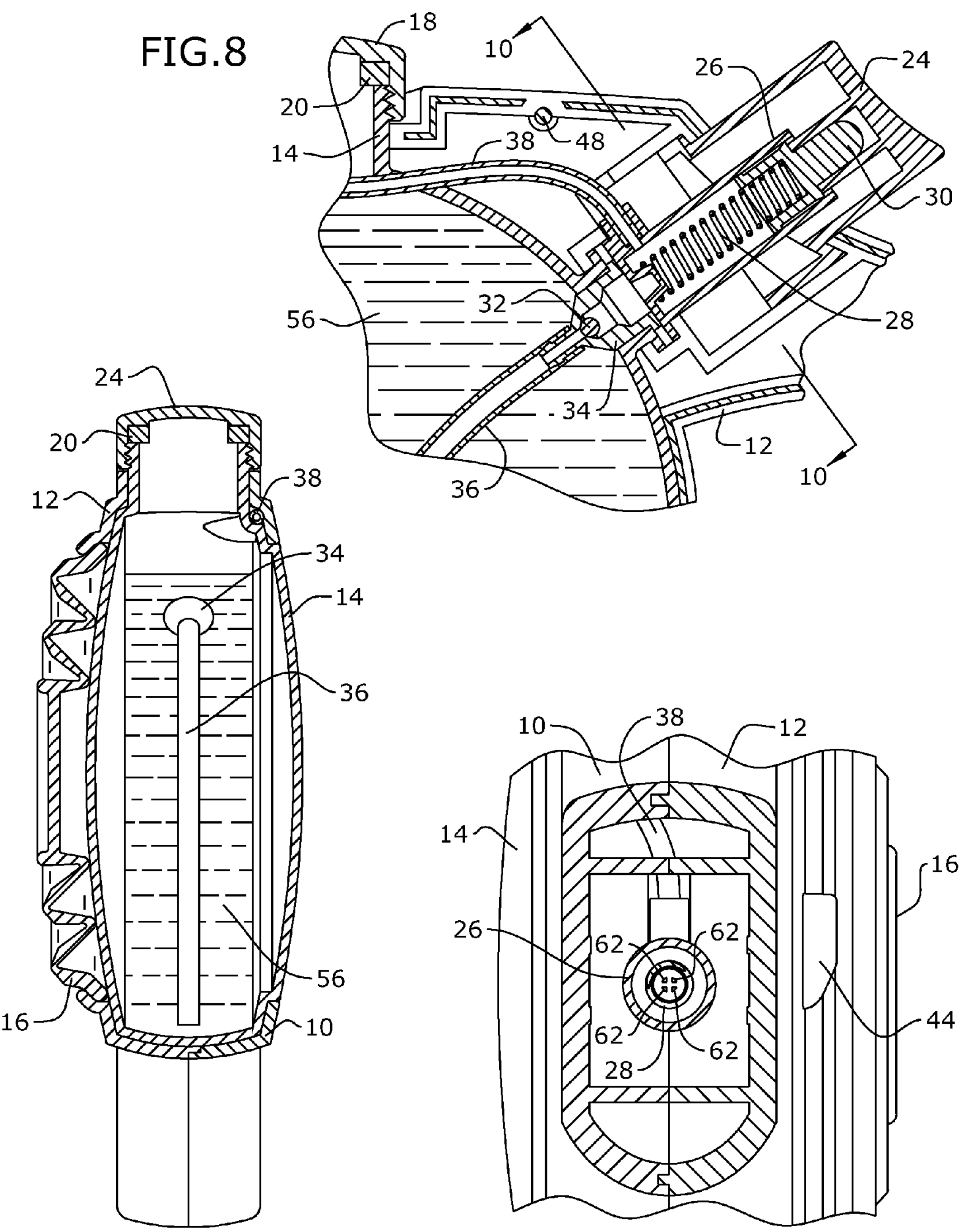
FIG. 8 is an enlarged section view of a portion of the exemplary embodiment of the present invention shown in FIG. 5.
FIG. 9 is a section view of an exemplary embodiment of the present invention, taken along line 9-9 in FIG. 5.
FIG. 10 is a section view of an exemplary embodiment of the present invention, taken along line 10-10 in FIG. 8.

The plunger 30 may act as a piston movable from a loaded position to an unloaded position by manually exerting and releasing, respectively, force on the interconnected trigger 24. Exerting force on the trigger 24 urges the plunger 30 to apply pressure the portion of the liquid 56 within the chamber, as illustrated in FIG. 5, causing the liquid 56 to flow out the spray outlet 46 as a jet or spray of the liquid 56. Upon the user 50 releasing the trigger 24, a suction motion draws a new portion of the liquid 56 from the reservoir 14 cavity, through the tube 36, through the in-valve 34, through a plurality of flow holes 62 and into the recently discharged chamber as the spring 28 urges the plunger 30 back toward its unloaded position. In the unloaded position, and as the plunger moves toward the loaded position, the in-valve ball 32 is dimensioned and adapted to seal the in-valve 34 so that the new portion of the liquid is prevented from flowing into the tube 36. The trigger 24 is disposed near the handle portion 64.

The pump egress may be operably interconnected to the spray outlet 46 by spray tube 38, an out-valve 40, and an out-valve ball 42 dimensioned and adapted to discharge the flow of liquid 60, under pressure, from the pump egress and out the spray outlet 46 as a jet or spray of liquid 56. In effect, the spray outlet, via the liquid sprayer 80, is in fluid communication with the reservoir 14.

The leash assembly 90 may be disposed near the front end of the housing. The leash assembly 90 may include a leash hook 22 for removably connecting a dog leash 54 thereto. In certain embodiments, the leash assembly 90 may include a retractable leash system or any other known leash system known in the art for leashing a walking dog.

Figures 4, 11:
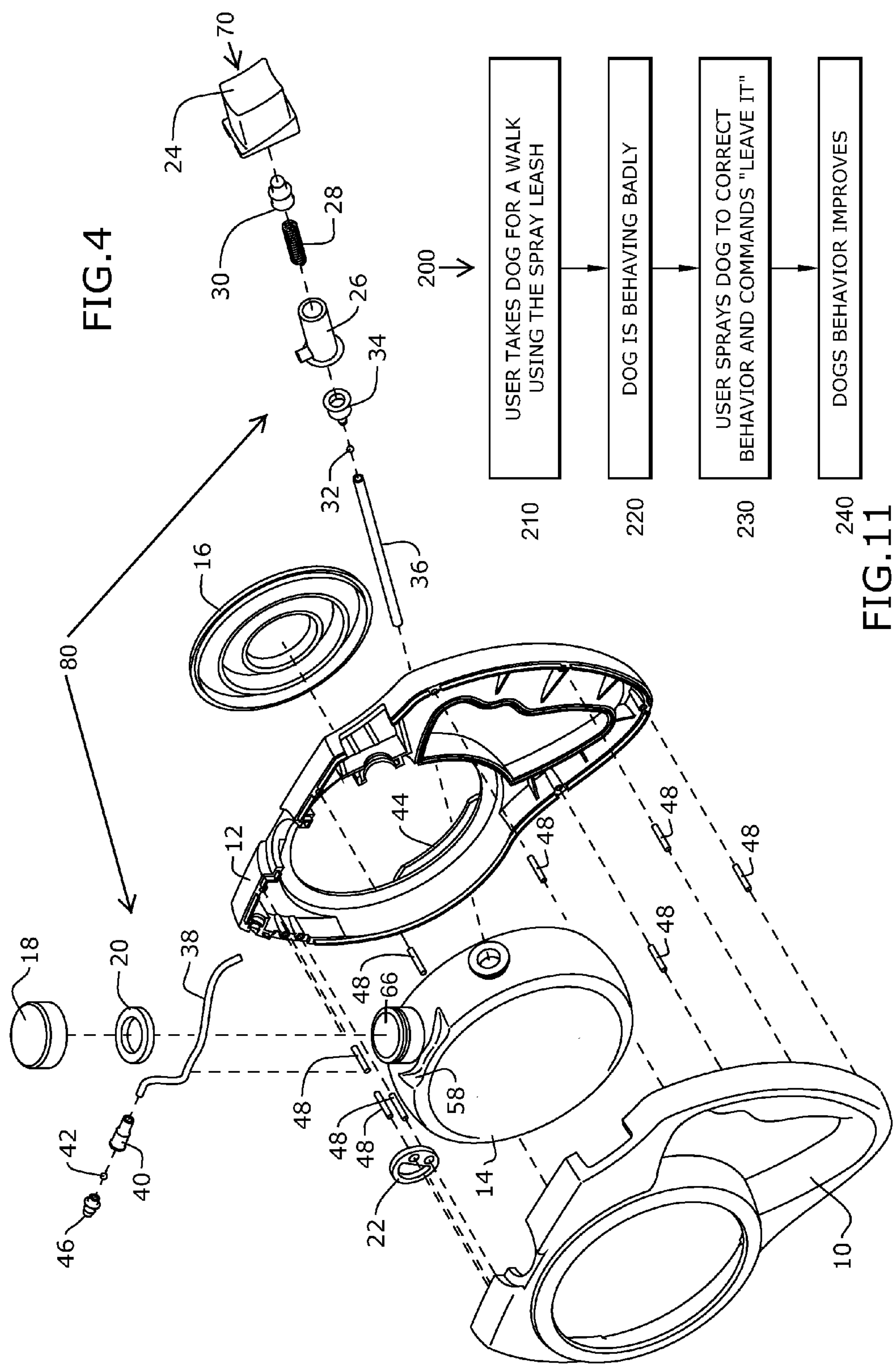
FIG. 4 is an exploded view of an exemplary embodiment of the present invention.
FIG. 11 is a flow chart of an exemplary embodiment of the present invention in use.

Referring to FIG. 11, a method of using the present invention may include the following. The user 50 may connect the dog 52 to the leash assembly 90, in step 210. In step 220, the dog 52 engages in bad behavior. Then, in step 230, the user 50 discharges a jet of liquid 56 at or near the dog 52. In certain embodiments, step 230 is done in conjunction with a command. The command may be "leave it" or some other functional command understood by the dog 52 to cease such behavior. In step 240, the dog 52 improves their behavior.

It should be understood, of course, that the foregoing relates to exemplary embodiments of the invention and that modifications may be made without departing from the spirit and scope of the invention as set forth in the following claims.

What is claimed is:

1. A method of training a domesticated animal restrained by a leash, comprising the steps of:
- providing a leash training device comprising:
  - a housing having a front end and a rear end, wherein the housing houses a liquid sprayer;
  - a sprayer outlet disposed near the front end, wherein the spray outlet is fluidly communicating with the liquid sprayer;
  - a handle portion disposed near the rear end, wherein the handle portion provides a trigger for selectively engaging the liquid sprayer; and
  - a leash assembly disposed near the front end;
- filling the liquid sprayer with a non-threatening liquid;
- interconnecting the leash between the domesticated animal and the leash assembly; and
- selectively triggering the liquid sprayer to urge a jet of the non-threatening liquid through the spray outlet toward the domesticated animal when it is engaged in correctible behavior.

2. The method of claim 1, wherein the jet of liquid hits the domesticated animal.

3. The method of claim 1, further comprising the step of uttering a command around the time of the correctible behavior.

4. The method of claim 3, wherein the command is "leave it".

5. The method of claim 1, wherein the non-threatening liquid is water.

6. The method of claim 1, wherein the correctible behavior is a common issue when walking the domesticated animal.

7. The method of claim 1, wherein the domesticated animal is a pet dog.

8. A method of training a domesticated animal restrained by a leash, comprising the steps of:
- providing a leash training device comprising:
  - a sprayer outlet disposed at a front end of the leash training device, wherein the spray outlet is adapted to spray a non-threatening liquid housed therein; and
  - a leash assembly disposed near the sprayer outlet;
- interconnecting the leash between the domesticated animal and the leash assembly; and
- selectively spraying the non-threatening liquid through the spray outlet toward the domesticated animal when it is engaged in correctible behavior.

* * * * *